(12) United States Patent
Sugahara et al.

(10) Patent No.: US 8,006,010 B2
(45) Date of Patent: Aug. 23, 2011

(54) INFORMATION SHARING SYSTEM AND RELAY DEVICE CAPABLE OF CONTROLLING PERIPHERAL ACCORDING TO USER MANIPULATION

(75) Inventors: Yoshinori Sugahara, Kyoto (JP);
Kagumi Moriwaki, Kawanishi (JP);
Kenji Masaki, Nagaokakyo (JP);
Hiroyuki Ozawa, Kawasaki (JP);
Tsutomu Suka, Fussa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 99 days.

(21) Appl. No.: 12/557,282

(22) Filed: Sep. 10, 2009

(65) Prior Publication Data

US 2010/0070654 A1    Mar. 18, 2010

(30) Foreign Application Priority Data

Sep. 12, 2008  (JP) .................................. 2008-235229

(51) Int. Cl.
*G06F 13/12* (2006.01)
(52) U.S. Cl. ................ 710/62; 710/63; 710/72
(58) Field of Classification Search .................... 710/62, 710/63, 72
See application file for complete search history.

(56) References Cited

U.S. PATENT DOCUMENTS

| | | | |
|---|---|---|---|
| 6,671,756 B1 * | 12/2003 | Thomas et al. | 710/73 |
| 2006/0259586 A1 * | 11/2006 | Wood et al. | 709/219 |
| 2008/0016155 A1 * | 1/2008 | Khalatian | 709/204 |

FOREIGN PATENT DOCUMENTS

JP         8-88843 A       4/1996

* cited by examiner

*Primary Examiner* — Alford Kindred
*Assistant Examiner* — David Martinez
(74) *Attorney, Agent, or Firm* — Sidley Austin LLP

(57) ABSTRACT

A workspace control unit performs a process on a common work area screen for sharing information, and an information processor display transmission and reception unit transmits to a display of an information processor the common work area screen processed by the workspace control unit. An information processor manipulation detection unit detects manipulation performed on the common work area screen of the information processor. A peripheral control unit controls a peripheral based on control information managed by a peripheral control information management unit according to the result of detection by the information processor manipulation detection unit.

5 Claims, 12 Drawing Sheets

| PORT 1 | IP ADDRESS AD 1 | PC (5) |
| PORT 2 | IP ADDRESS AD 2 | PC (10) |
| PORT 3 | IP ADDRESS AD 3 | TV CONFERENCE (15) |

| OBJECT DISPLAY MANIPULATION | SET CAMERA ANGLE TO ANGLE ASSOCIATED WITH PORT CORRESPONDING TO PROCESSOR PERFORMING MANIPULATION |
|---|---|
| OBJECT NON-DISPLAY MANIPULATION | SET TO INITIAL STATE |

FIG.15

(a)
```
PLEASE ENTER ANGLE BETWEEN TV
CONFERENCE SYSTEM AND CONNECTION PORT
```
— 80

| PORT 1 | 0° | EDIT |
|---|---|---|
| PORT 2 | 0° | EDIT |
| PORT 3 | — | EDIT |

— 82

[Ok] 84   [Cancel] 86

(b)
PLEASE ENTER ANGLE FOR PORT 1 — 90

92 — [ ] DEGREES

[Ok] 94   [Cancel] 96

FIG.16

| CAMERA ANGLE SETTING TABLE | | |
|---|---|---|
| PORT 1 | PC (5) | 30° |
| PORT 2 | PC (10) | −30° |
| PORT 3 | TV CONFERENCE (15) | — |

FIG.18

(a)
```
PLEASE SELECT OPERATION SETTING FOR          100
PROJECTOR
                                             102
OBJECT DISPLAY         [ NONE  ▼ ]
MANIPULATION

OBJECT NON-DISPLAY     [ NONE  ▼ ]
MANIPULATION

[ OK ]
         104
```

(b)
```
PLEASE SELECT OPERATION SETTING FOR
PROJECTOR

OBJECT DISPLAY         [ NONE  ▼ ]
MANIPULATION           | NONE                           |
                       | TURN OFF PROJECTOR             |
OBJECT NON-DISPLAY     | TURN ON PROJECTOR              |
MANIPULATION           | TURN ON PROJECTOR AND          |
[ OK ]                 | PROJECT OBJECT VIEW            |
```

(c)
```
PLEASE SELECT OPERATION SETTING FOR PROJECTOR

OBJECT DISPLAY         [ TURN ON PROJECTOR     ▼ ]
MANIPULATION

OBJECT NON-DISPLAY     [ NONE                  ▼ ]
MANIPULATION

[ OK ]
       108
```

INFORMATION SHARING SYSTEM AND RELAY DEVICE CAPABLE OF CONTROLLING PERIPHERAL ACCORDING TO USER MANIPULATION

This application is based on Japanese Patent Application No. 2008-235229 filed with the Japan Patent Office on Sep. 12, 2008, the entire content of which is hereby incorporated by reference.

BACKGROUND OF THE INVENTION

1. Field of the Invention

The present invention relates to an information sharing system, and particularly to a system in which an information processor or the like such as personal computer (PC) and a peripheral or the like such as printer are connected with a relay device to control the peripheral via the relay device.

2. Description of the Related Art

Recently, workstations, PCs and the like have been downsized and reduced in price, and accordingly an environment where one person can exclusively use one PC has become common. Further, the advancement of the network such as LAN (Local Area Network) allows all PCs to be connected with the network so that data can be exchanged between the PCs, for example.

A system that allows PCs to share one screen, and a system that enables information to be shared by holding a desktop conference, TV (television) conference or the like and communicating image and voice for example, in the environment as described above, are being developed as disclosed for example in Japanese Laid-Open Patent Publication No. 08-088843.

Even if a system enables PCs to share one screen and accordingly share information, for example, generally the system does not cooperate with peripherals such as scanner, projector, and TV conference system. Thus, if such a peripheral is used, it is necessary to independently manipulate the peripheral according to the purpose and status of the peripheral.

In other words, in the system that enables information to be shared, cooperative process with peripherals is not generally performed.

SUMMARY OF THE INVENTION

The present invention has been made to solve the above-described problem. An object of the invention is to provide an information sharing system and a relay device capable of controlling a peripheral according to user manipulation in the system enabling information to be shared.

According to an aspect of the present invention, an information sharing system includes: an information processor having a display and an input device for manipulating information displayed on the display; a peripheral capable of at least one of accepting input of information and outputting information; and a relay device connected with the information processor and the peripheral. The relay device includes: a transmitter for transmitting a common work area screen for sharing information to the information processor connected with the relay device; and a controller for controlling the relay device. The controller detects manipulation by the input device of the information processor on the common work area screen transmitted to the information processor, executes a process according to a result of detection of the manipulation by the input device of the information processor on the common work area screen, and controls operation of the peripheral connected with the relay device according to the result of detection of the manipulation by the input device of the information processor.

Preferably, the controller identifies type of the peripheral connected with the relay device, the relay device further includes a memory in which control information for controlling operation of the peripheral according to the identified type of the peripheral is registered, and the controller outputs to the peripheral the control information registered in the memory, according to the result of detection of the manipulation by the input device of the information processor.

Preferably, the information sharing system further includes: another relay device configured identically to the relay device and connected with the relay device by a network; and another peripheral connected with the other relay device. The relay device and the other relay device each further include a communication device capable of transmitting and receiving information to and from each other via the network. The controller of the relay device transmits, to the other relay device using the communication device, control information for controlling the other peripheral connected with the other relay device, and a controller of the other relay device receives the control information and controls operation of the other relay device according to the received control information.

Preferably, the manipulation by the input device of the information processor corresponds to at least one of an instruction to open, an instruction to close, an instruction to move, an instruction to display in fill-screen mode, an instruction to delete, and an instruction to print, a data file on the common work area screen.

Preferably, the peripheral corresponds to at least one of a TV conference system, a printer, a scanner, a camera, a microphone, an IP telephone, and a projector.

According to another aspect of the present invention, a relay device includes: a connector connected with an information processor having a display and with a peripheral; a transmitter for transmitting a common work area screen for sharing information, to the information processor; and a controller for entirely controlling the relay device. The controller detects manipulation by an input device of the information processor on the common work area screen transmitted to the information processor, executes a process according to a result of detection of the manipulation by the input device of the information processor on the common work area screen, and controls operation of the peripheral connected with the relay device according to the result of detection of the manipulation by the input device of the information processor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 illustrates a camera angle setting screen.

FIG. 16 illustrates a camera angle setting table.

FIG. 18 illustrates how a display manipulation or non-display manipulation on an object in a workspace and an operation of a projector are associated with each other according to the second embodiment of the present invention.

DESCRIPTION OF THE PREFERRED EMBODIMENTS

Figure 1:
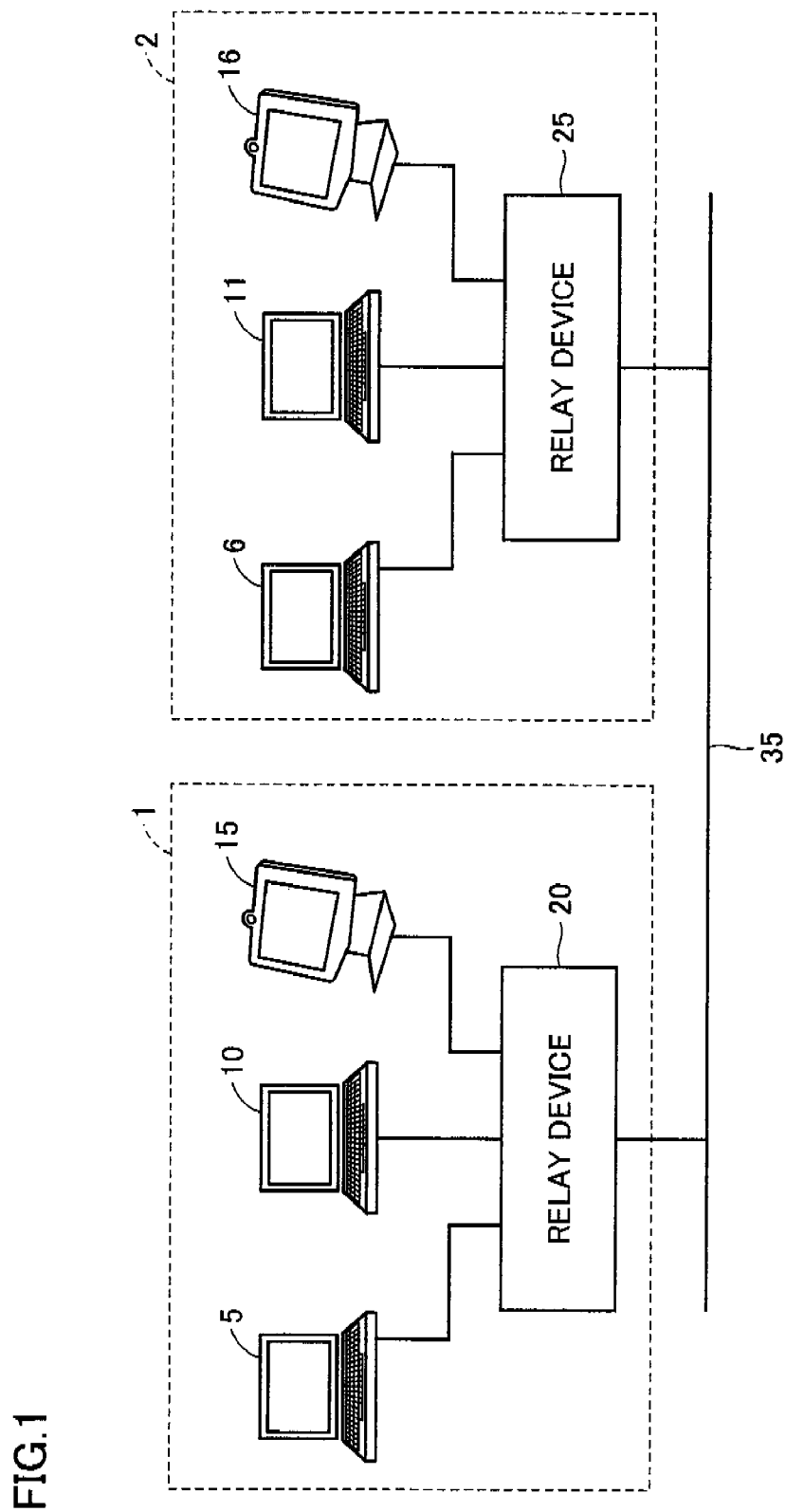
FIG. 1 is a schematic illustrating an information sharing system according to a first embodiment of the present invention.

Embodiments of the present invention will be described hereinafter with reference to the drawings. In the following description, like parts or components are identified by like reference characters. They also have like names and like functions.

First Embodiment

FIG. 1 will be used to describe an information sharing system according to a first embodiment of the present invention.

Referring to FIG. 1, information sharing units 1, 2 configured in a local area are provided, and information sharing units 1, 2 are connected with each other by a network 35. While only information sharing units 1, 2 are connected with each other by network 35 according to the description of the present embodiment, the information sharing system is not particularly limited to this configuration. The system may be configured to include an additional plurality of information sharing units connected with the network or may be configured to include only one information sharing unit. Network 35 may be LAN (Local Area Network) or WAN (Wide Area Network) using public lines or the like.

Information sharing unit 1 according to the first embodiment of the present invention includes PCs (Personal Computers) 5, 10 that are each a kind of information processor, a TV conference system 15, and a relay device 20.

Information sharing unit 2 also includes PCs (Personal Computers) 6, 11 that are each a kind of information processor, a TV conference system 16, and a relay device 25.

Relay devices 20, 25 are connected with network 35,

TV conference systems 15, 16 are each provided with a camera, and an image captured by the camera is displayed by a television.

Figure 2:
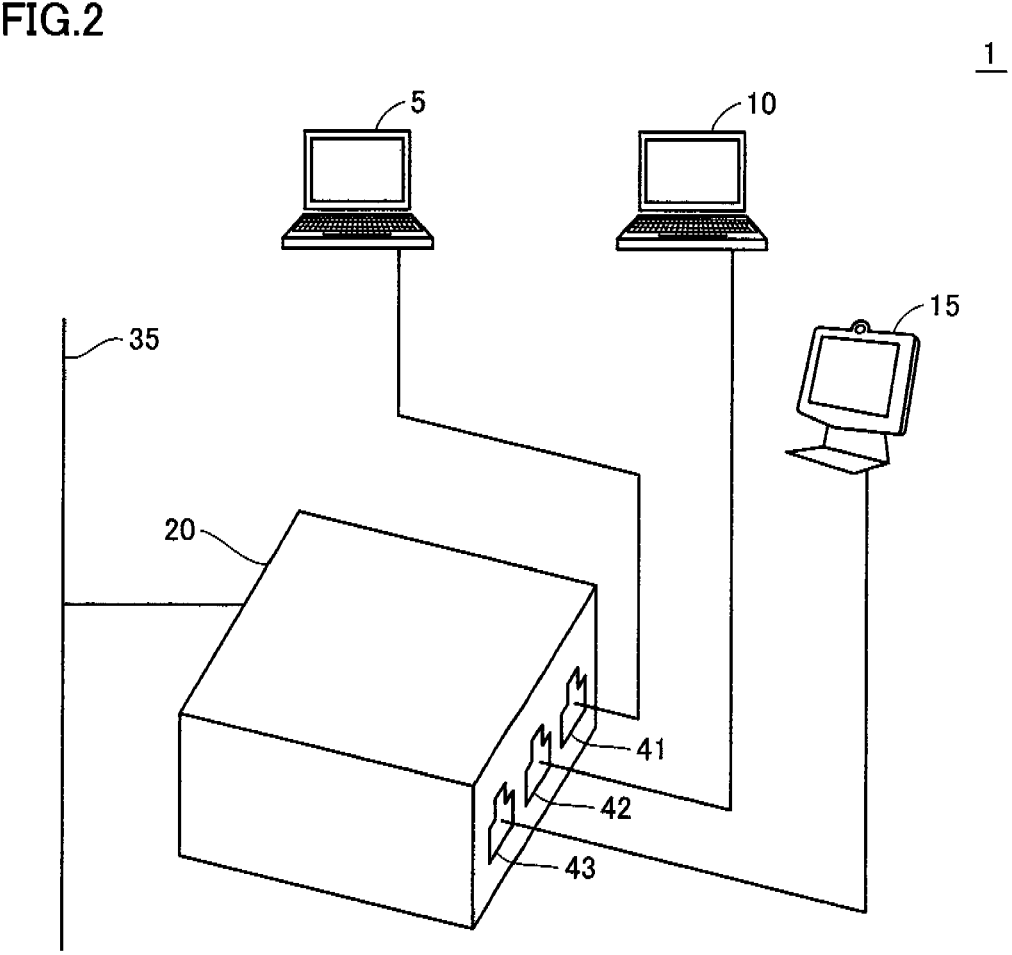
FIG. 2 is a schematic illustrating a structure of a relay device.

FIG. 2 will be used to describe a structure of relay device 20.

Referring to FIG. 2, relay device 20 in the present embodiment is provided with connector terminals 41 to 43 by way of example, connected via connector terminal 41 with PC 5, connected via connector terminal 42 with PC 10, and connected via connector terminal 43 with TV conference system 15. Relay device 20 is also provided with a connector terminal (not shown) connected with network 35.

The number of connector terminals is not limited to a particular one. While the structure of relay device 20 has been described in connection with the present embodiment, the structure of relay device 25 is similar to the above-described one.

Figures 3, 4:
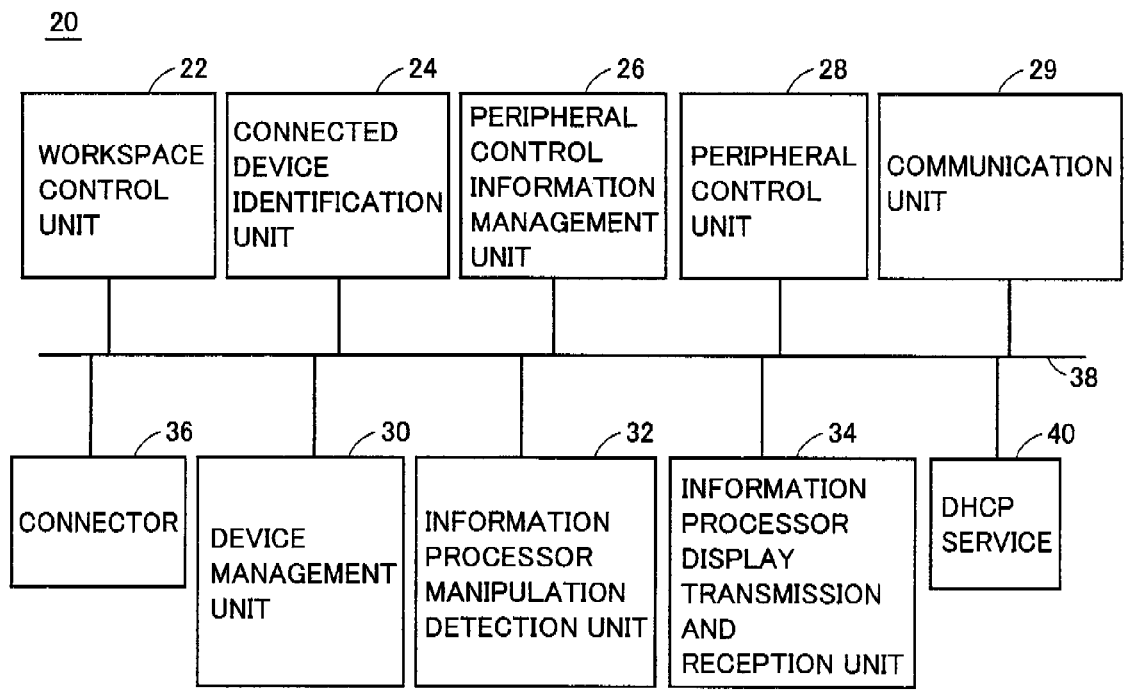
FIG. 3 is a schematic block diagram illustrating a configuration of the relay device according to the first embodiment of the present invention.
FIG. 4 illustrates a device management table managed by a device management unit.

FIG. 3 will be used to describe a configuration of relay device 20 according to the first embodiment of the present invention.

Referring to FIG. 3, relay device 20 according to the first embodiment of the present invention includes a workspace control unit 22, a connected device identification unit 24, a peripheral control information management unit 26, a peripheral control unit 28, a device management unit 30, an information processor manipulation detection unit 32, an information processor display transmission and reception unit 34, a connector 36, a communication unit 29, a DHCP (Dynamic Host Configuration Protocol) service 40, and an internal bus 38.

Connector 36 includes the connector terminal connected with network 35 and connector terminals 41-43 (not shown), and relay device 20 is connected with information processors and a peripheral via connector terminals 41-43. The peripheral is connected with relay device 20 via the connector terminal so that data can be transmitted and received via relay device 20.

Workspace control unit 22 performs a process for a common work area screen for sharing information as described later. Workspace control unit 22 is provided with a storage area (not shown) for performing the process for the common work area screen. Software for controlling various operations of the workspace is also stored in the storage area. The storage area may be provided in workspace control unit 22, or may be provided at another location. The location where the storage area is provided is not limited to a particular one.

Connected device identification unit 24 identifies respective types and attributes of devices connected respectively via connector terminals 41-43 provided to connector 36. Specifically, connected device identification unit 24 communicates with a device to which an IP (Internet Protocol) address is allocated by DHCP service 40 as described later, by means of a general-purpose protocol such as MIB (Management Information Base), to obtain the type and attribute of the device. Since relay device 20 has the connector terminal connected with network 35 as described above, DHCP service 40 also allocates an IP address to another relay device (relay device 25 in the present embodiment) with which relay device 20 is connected via network 35, and connected device identification unit 24 also recognizes relay device 25.

Peripheral control information management unit 26 manages control signal information or the like for controlling a peripheral. Specifically, peripheral control information management unit 26 stores in advance control signal information or the like for controlling a device identified by connected device identification unit 24, according to the identified type and attribute of the device. Regarding storage of the control signal information for controlling a peripheral, the control signal information may be automatically downloaded to be stored, from a server connected via the network and storing the control signal information, or may be downloaded from a storage medium storing the control signal information, via connector 36.

Peripheral control unit 28 controls the peripheral based on the control information managed by peripheral control information management unit 26.

DHCP service 40 automatically allocates and stores an IP address to a device connected with a connector terminal provided to connector 36.

Device management unit 30 stores and manages a relationship between a port number corresponding to a connector terminal, an IP address allocated by DHCP service 40, and device type and attribute obtained by connected device identification unit 24.

Information processor manipulation detection unit 32 detects manipulation performed on the common work area screen of information processors 5, 10.

Information processor display transmission and reception unit 34 transmits to respective display units of information processors 5, 10 the common work area screen processed by workspace control unit 22. Information processor display transmission and reception unit 34 also receives a common work area screen distributed via an external network and transmits the common work area screen to respective display units of information processors 5, 10.

Communication unit 29 transmits and receives data to and from an external device, for example, another relay device connected via network 35.

These components are each connected with internal bus 38, so that the components can transmit and receive data to and from each other via internal bus 38.

FIG. 4 will be used to describe a device management table managed by device management unit 30.

Referring to FIG. 4, ports 1 to 3 are provided in association with connector terminals 41-43 respectively, and IP addresses AD1-AD3 are allocated using DHSP service 40 as described above.

Connected device identification unit 24 recognizes the type of device connected with the connector terminal corresponding to port 1 as PC (5), recognizes the type of device connected with the connector terminal corresponding to port 2 as PC (10), and recognizes the type of device connected with the connector terminal corresponding to port 3 as TV conference system (15).

Figure 5:
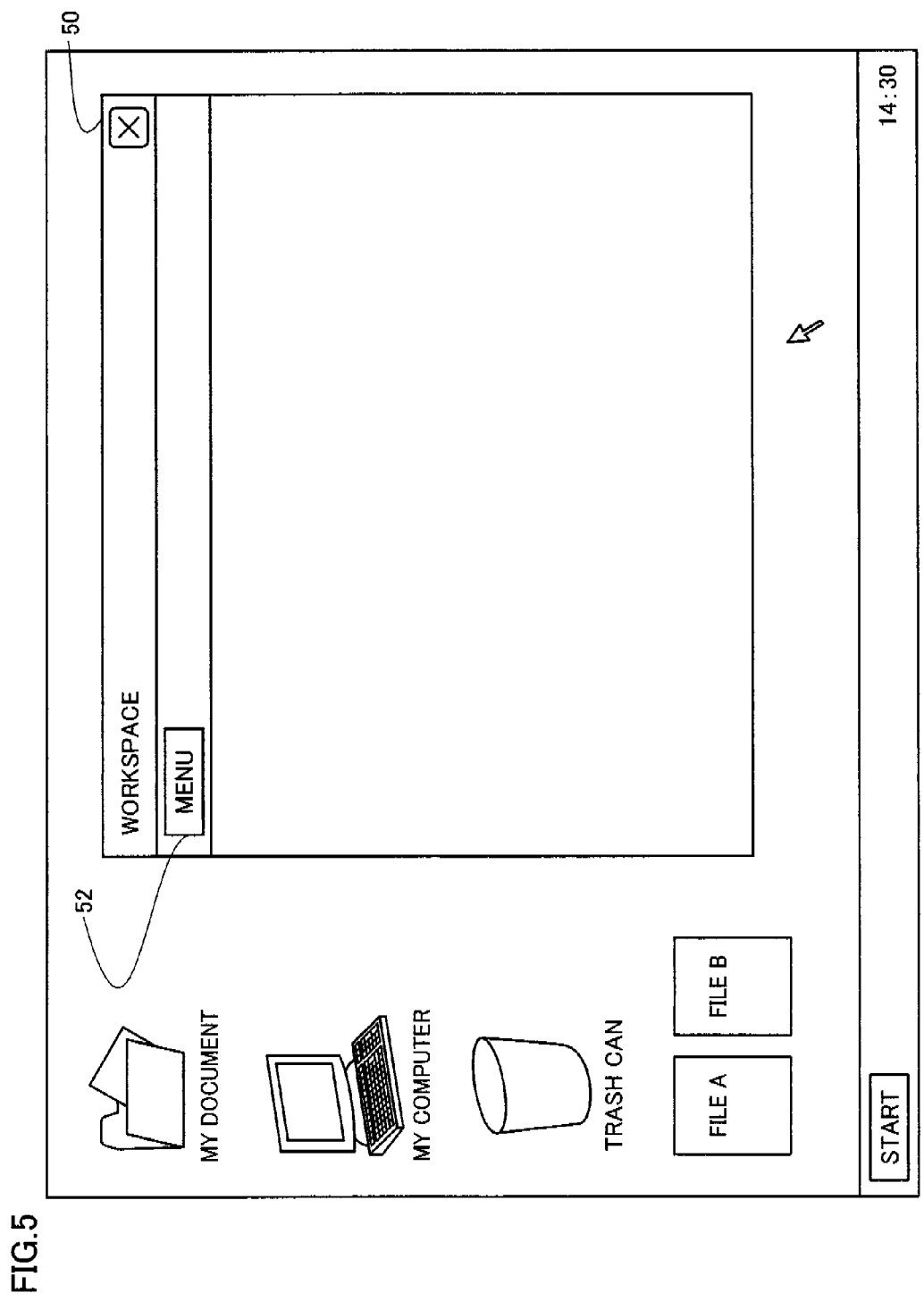
FIG. 5 illustrates a common work area screen displayed on respective display units of information processors.

FIG. 5 will be used to describe a common work area screen displayed on respective display units of information processors 5, 10.

Referring to FIG. 5, a workspace 50 that is a common work area screen is displayed on the desktop of the display unit. In an upper row, an item "MENU" is displayed with which various functions of the workspace can be performed. The workspace can be manipulated by means of a pointing device such as mouse. Here, in a region outside workspace 50, objects of "FILE A" and "FILE B" are displayed.

By way of example, a pointing device such as mouse can be used to position a cursor on "FILE A" or "FILE B" and move "FILE A" or "FILE B" into the workspace by so-called drag-and-drop. Further, the pointing device can be manipulated to do handwriting input on the workspace.

Figure 6:
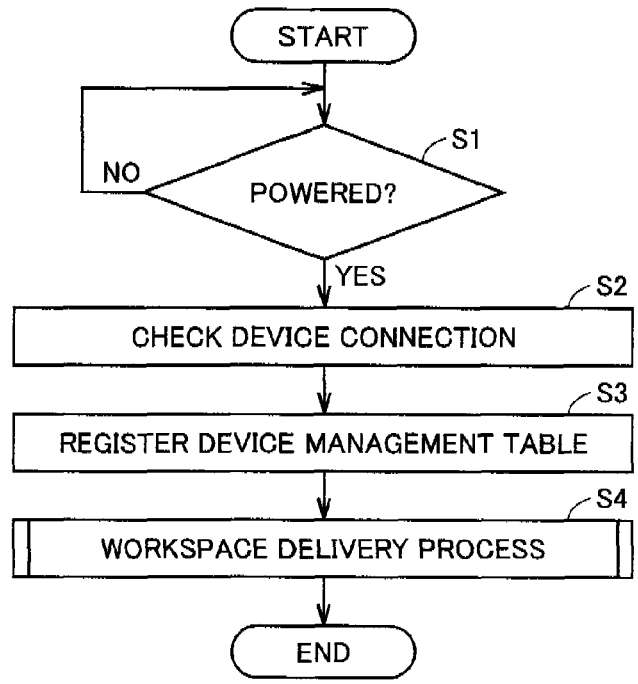
FIG. 6 is a flow diagram illustrating a workspace activation process of a relay device according to the first embodiment of the present invention.

FIG. 6 will be used to describe a workspace activation process of relay device 20 according to the first embodiment of the present invention.

Referring to FIG. 6, it is determined first whether or not relay device 20 is powered (step S1).

When relay device 20 is powered, the above-described software stored in the storage area (not shown) of relay device 20 for controlling various operations of the workspace is loaded, so that each component of relay device 20 can perform a process concerning the workspace.

Next, connection of a device is checked (step S2). Specifically, connected device identification unit 24 recognizes respective types of devices connected with connector terminals 41-43.

Then, device management unit 30 registers data concerning the connected devices in the device management table, according to the identified device types as described above (step S3).

Then, a workspace delivery process is performed (step S4). The workspace activation process is thus completed (END).

Figure 7:
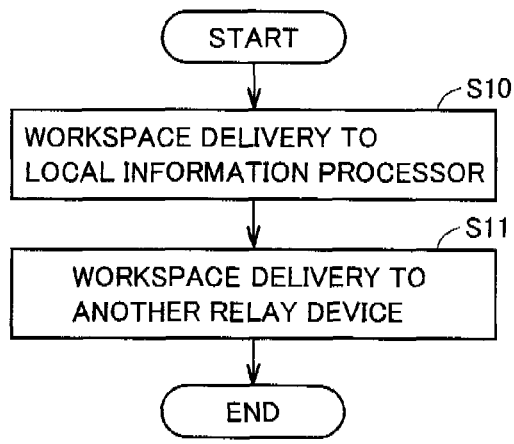
FIG. 7 is a flow diagram illustrating a workspace delivery process.

FIG. 7 will be used to describe the workspace delivery process.

Referring to FIG. 7, the workspace delivery process is performed first for a local information processor (step S110). Specifically, workspace control unit 22 performs a display process for the initial screen of the workspace. Then, information processor display transmission and reception unit 34 transmits the initial screen of the workspace processed by workspace control unit 22 to an information processor registered in the device management table of device management unit 30.

Next, the workspace delivery process is performed for another relay device (step S11). The whole workspace delivery process is thus completed (END).

Specifically, information processor display transmission and reception unit 34 transmits the initial screen of the workspace to an external relay device via communication unit 29 and network 35.

In the present embodiment, the external relay device to which the initial screen is transmitted is relay device 25, for example.

Figure 8:
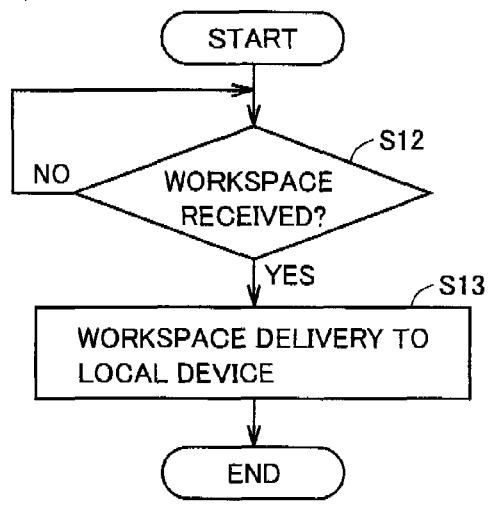
FIG. 8 is a flow diagram illustrating a workspace reception process.

FIG. 8 will be used to describe a workspace reception process.

Referring to FIG. 8, it is determined whether or not a workspace is received (step S12).

In the present embodiment, relay device 25 receives the workspace.

Specifically, information processor display transmission and reception unit 34 of relay device 25 receives the workspace via communication unit 29 of relay device 25.

Then, a workspace delivery process is performed for a local information processor (step S13). Specifically, information processor display transmission and reception unit 34 of relay device 25 transmits the workspace to respective display units of local information processors 6, 11.

Through this process, a workspace similar to workspace 50 displayed on information processors 5, 10 is displayed on respective display units of information processors 6, 11. In other words, the workspace that is a common work area screen for sharing information is delivered to information processors 6, 11.

The workspace delivery process and the workspace reception process described above with reference to FIGS. 7 and 8 are executed each time a process is performed for the workspace.

Figure 9:
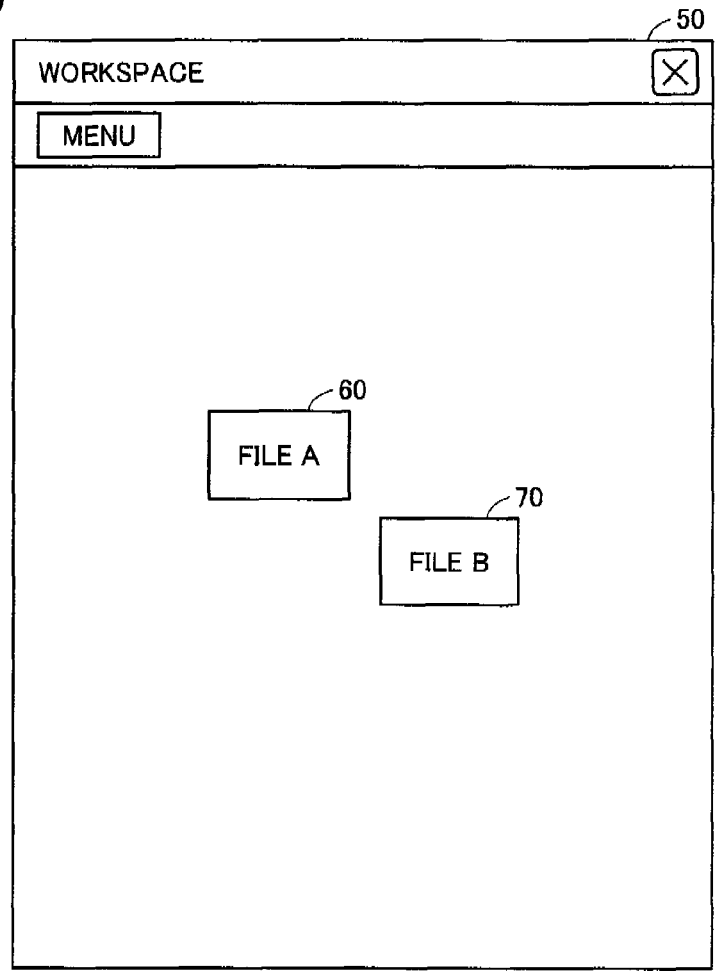
FIG. 9 illustrates a case where files that are objects are moved into a workspace.

FIG. 9 will be used to describe the case where a file that is an object is moved into the workspace.

FIG. 9 shows a screen on which respective objects of FILE A and FILE B which are displayed outside workspace 50 on the desktop of the display unit of information processor 5 shown in FIG. 5 are moved into workspace 50.

In the present embodiment, by way of example, the objects of FILE A and FILE B displayed on the display unit of information processor 5 are moved into workspace 50.

Specifically, at information processor 5, "FILE A" and "FILE B" are moved into workspace 50 through drag-and-drop by a pointing device such as mouse as described above.

At relay device 20, information processor manipulation detection unit 32 detects that an object 60 of "FILE A" and an object 70 of "FILE B" are entered in workspace 50 at information processor 5, and outputs the result of detection to workspace control unit 22. Information processor manipulation detection unit 32 also detects respective coordinate positions in the workspace where the objects are placed respectively using the pointing device such as mouse, and outputs the result of detection to workspace control unit 22.

Based on the results of detection provided from information processor manipulation detection unit 32, workspace control unit 22 performs a display process for the common work area screen (workspace) for sharing information. Then, information processor display transmission and reception unit 34 transmits the workspace processed by workspace control unit 22 to respective display units of information processors 5, 10 (workspace delivery process).

Figure 10:
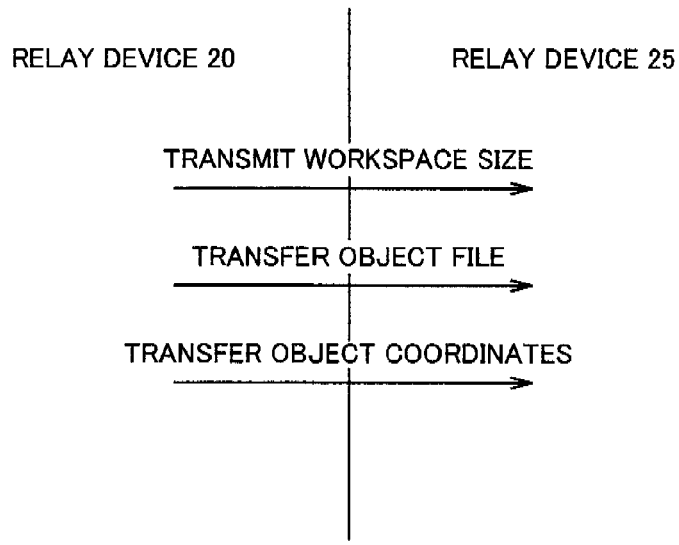
FIG. 10 illustrates data processing performed when a workspace is transmitted from a relay device to another relay device.

FIG. 10 will be used to describe data processing performed when a workspace is transmitted from relay device 20 to relay device 25.

Referring to FIG. 10, when the workspace is transmitted from relay device 20 to relay device 25, the size of the workspace when displayed on the display unit is transmitted. In the case where an object is placed in the workspace, the file of the object is transferred to relay device 25 in response to entering of the object in the workspace as detected by information processor manipulation detection unit 32.

Further, in the case where the object is placed in the workspace, the coordinates of the object in the workspace as detected by information processor manipulation detection unit 32, based on the size of the workspace, are also transferred to relay device 25.

Through this process, the information about the workspace is received by information processor display transmission and reception unit 34 of relay device 25, processed by workspace control unit 22 and then transmitted to local information processors 6, 11 (workspace delivery process).

Accordingly, the same workspace as the workspace displayed on information processor 5 is displayed on respective display units of local information processors 6, 11.

Figure 11:
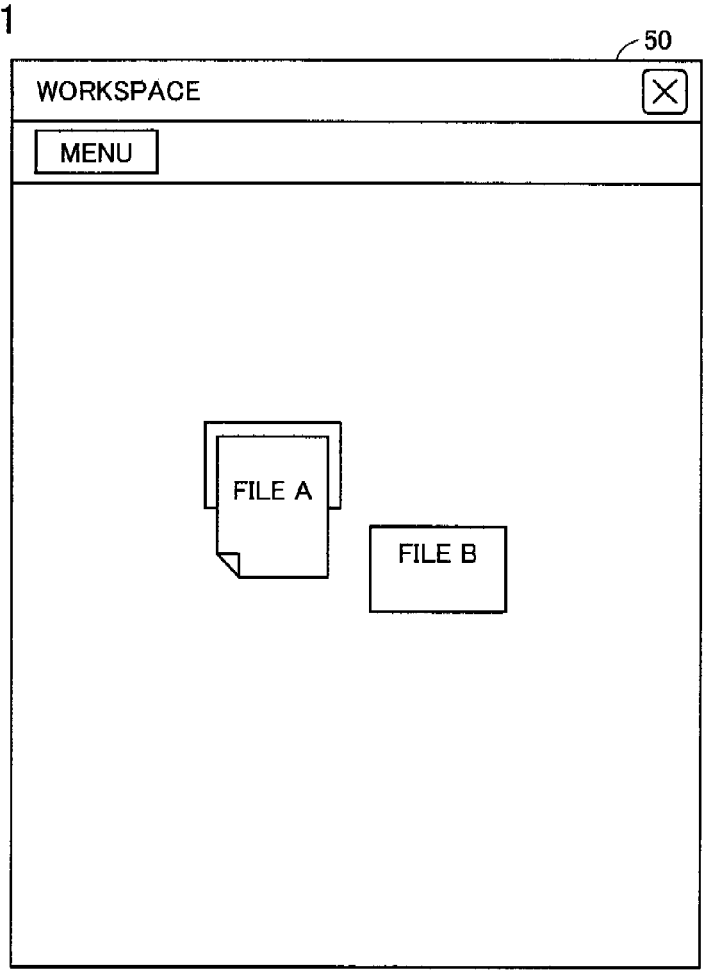
FIG. 11 illustrates a case where a display manipulation is performed on an object placed in the workspace.

FIG. 11 will be used to describe the case where a display manipulation is performed on an object placed in workspace 50.

Referring to FIG. 11, the screen is shown that appears when the display manipulation is done for displaying the contents of FILE A placed in workspace 50 as shown in FIG. 9.

Specifically, at information processor 5, a pointing device such as mouse is used as described above to position a cursor on and double-click the object of "FILE A" (instruction to open), so that the contents of "FILE A" are displayed on the screen.

Figure 12:
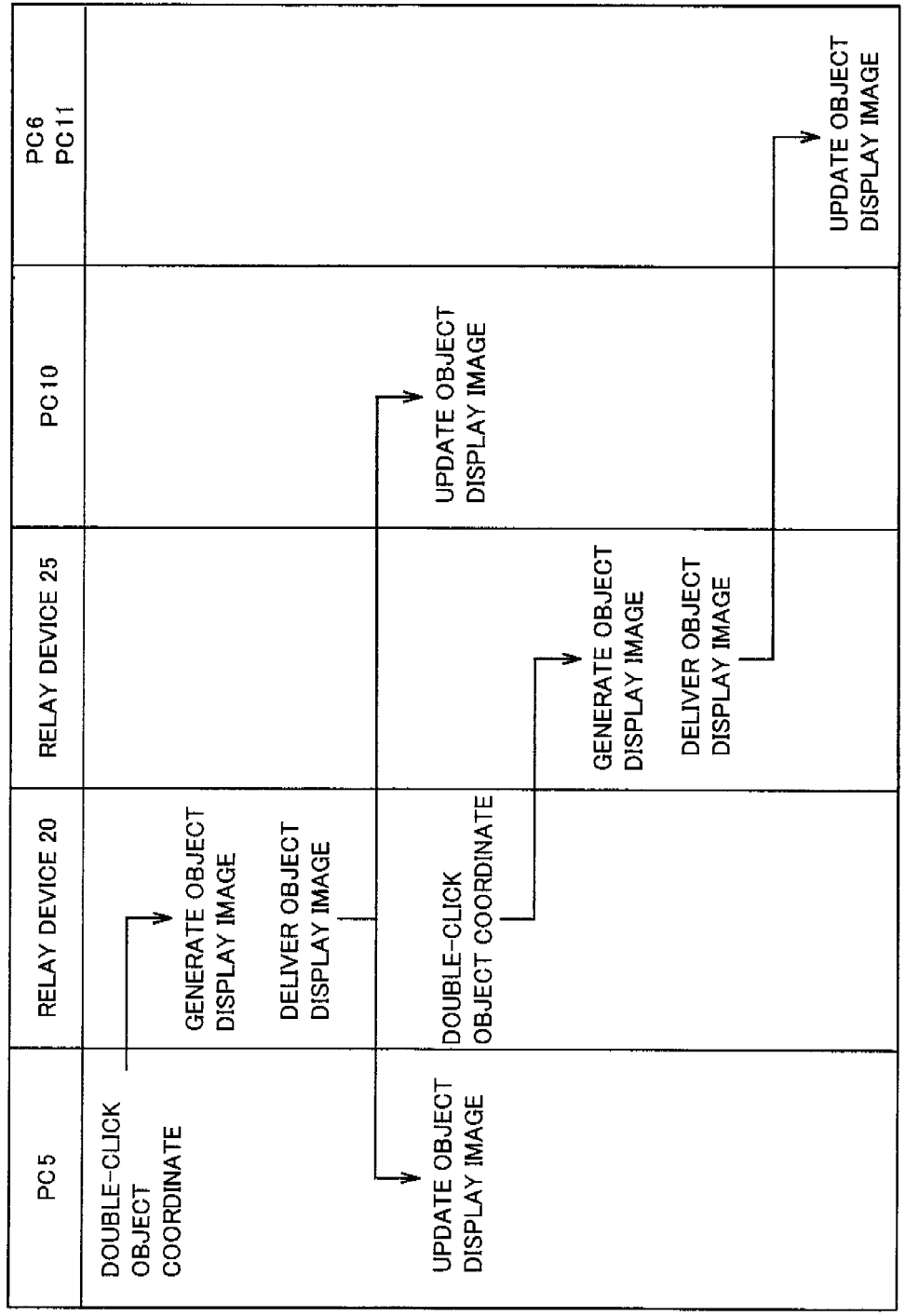
FIG. 12 illustrates a flow of processes in respective devices followed when a process as illustrated in FIG. 11 is performed on the object.

FIG. 12 will be used to describe a flow of processes in respective devices that is followed when the display manipulation is performed on the object as illustrated in FIG. 11.

Referring to FIG. 12, in the present embodiment, by way of example, the object coordinate position where "FILE A" is placed is double-clicked at information processor 5.

Information processor manipulation detection unit 32 of relay device 20 detects that the coordinate position of the object of "FILE A" in workspace 50 is double-clicked at information processor 5, and outputs the result of detection to workspace control unit 22.

Based on the result of detection from information processor manipulation detection unit 32, workspace control unit 22 performs a display process for the common work area screen (workspace) for sharing information. Specifically, the display process is performed to expand the contents of "FILE A" in response to the double-click of the object of "FILE A" with a cursor positioned thereon by the pointing device. In other words, a display image of the object in the workspace is generated by workspace control unit 22.

Then, information processor display transmission and reception unit 34 of relay device 20 transmits the workspace processed by workspace control unit 22 to respective display units of information processors 5, 10 (delivery of the object display image).

At respective display units of information processors 5, 10, a display process is performed for the workspace transmitted from information processor display transmission and reception unit 34. Namely, in the workspace, the object display image is updated to the object display image generated by workspace control unit 22 of relay device 20.

Information processor display transmission and reception unit 34 of relay device 20 also transmits to relay device 25 the result of detection by information processor manipulation detection unit 32 of relay device 20. Specifically, the result of detection, namely the information that the coordinate position of the object of "FILE A" in workspace 50 is double-clicked is transmitted to relay device 25.

Information processor display transmission and reception unit 34 of relay device 25 receives the information that the coordinate position of the object is double-clicked as transmitted from relay device 20, and outputs the information to workspace control unit 22.

Workspace control unit 22 of relay device 25 performs a display process for the common work area screen (workspace) for sharing information, based on the information received by information processor display transmission and reception unit 34. Specifically, it is determined that the coordinate position of the object is double-clicked, namely the pointing device is used to position a cursor on and double-click the object of "FILE A," and the display process is executed for expanding the contents of "FILE A". Namely, workspace control unit 22 of relay device 25 generates a display image of the object in the workspace.

Information processor display transmission and reception unit 34 of relay device 25 transmits the workspace processed by workspace control unit 22 to respective display units of information processors 6, 11 (delivery of the object display image).

At respective display units of information processors 6, 11, a display process is performed for the workspace transmitted from information processor display transmission and reception unit 34. Namely, in the workspace, the object display image is updated to the object display image generated by workspace control unit 22 of relay device 25.

On the contrary, at information processor 5, on the workspace where the contents of "FILE A" are displayed on the screen, when a pointing device such as mouse is used to position a cursor on and double-click the object of "FILE A" (instruction to close), the display of the contents of "FILE A" is ended. Namely, when a non-display manipulation is thus performed on the object, the workspace is updated back to the screen as shown in FIG. 9.

In this case as well, on the display unit of information processor 10 and respective display units of information processors 6, 11, the same workspace is displayed in a similar manner to the above-described one.

A description will now be given of a cooperative process with a TV conference system that is a peripheral according to the first embodiment of the present invention.

Specifically, a method for associating the display manipulation or non-display manipulation on an object in the workspace with a camera angle of the TV conference system will be described.

Figures 13, 14:
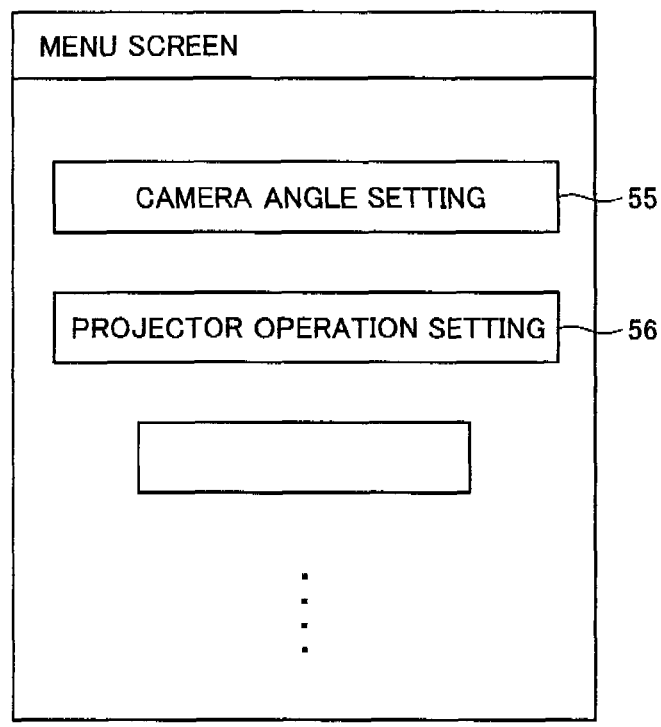
FIG. 13 illustrates how a display manipulation or non-display manipulation on an object in a workspace and a camera angle of a TV conference system are associated with each other according to the first embodiment of the present invention.
FIG. 14 illustrates a menu screen.

FIG. 13 will be used to describe how the display manipulation or non-display manipulation on an object in the workspace is associated with a camera angle of the TV conference system according to the first embodiment of the present invention. The command, namely an instruction concerning association of the display manipulation or non-display manipulation on an object in the workspace with a camera angle of the TV conference system is stored in advance in peripheral control information management unit 26. Control signal information for controlling the camera angle of the camera provided at the TV conference system is also stored in advance in peripheral control information management unit 26. Further, a camera angle setting table described later is stored in peripheral control information management unit 26 of relay device 20.

Referring to FIG. 13, when the display manipulation is performed on an object, the camera angle is set, by way of example, to an angle associated with the port corresponding to the connector terminal connected with the information processor at which the manipulation is performed.

In contrast, when the non-display manipulation is performed on the object, the camera angle is set to an initial state.

FIG. 14 will be used to describe a menu screen.

Referring to FIG. 14, when a mouse that is a pointing device is used to click (designate) "MENU" button 52 of workspace 50, the menu screen is displayed.

On the menu screen, a plurality of setting items are displayed including, by way of example, various items such as "camera angle setting" and "projector operation setting."

Here, by way of example, a "camera angle setting" button 55 is clicked (designated) by means of a mouse that is a pointing device.

FIG. 15 will be used to describe a camera angle setting screen 80.

Referring to FIG. 15(*a*), camera angle setting screen 80 is displayed here and, on the displayed screen, the angle can be set for each of ports 1 to 3.

A user can use a mouse that is a pointing device to click (designate) an "EDIT" button 82 and set an angle for the associated port.

Since port 3 corresponds to the TV conference system, the angle is set in advance to an initial value that cannot be edited.

FIG. 15(*b*) illustrates a camera angle edit screen 90.

Referring to FIG. 15(*b*), the screen is shown that is displayed when "EDIT" button 82 that is an item associated with port 1 is clicked (designated). On the screen, an angle for port 1 may be entered.

A user can enter an angle for port 1 in an input cell 92 by means of a keyboard for example and click (designate) an "OK" button 94, so that camera angle setting screen 80 is updated. Thus, the angle for the associated port can be edited. Here, when a "CANCEL" button 96 is clicked (designated), the screen returns to the preceding screen, namely the camera angle setting screen.

After the edit process, when "OK" button 84 of camera angle setting screen 80 in FIG. 15(*a*) is clicked (designated), the data of the camera angle setting table stored in peripheral control information management unit 26 of relay device 20 is updated. Before the edit process, an initial value is stored in advance.

FIG. 16 will be used to describe a camera angle setting table.

Referring to FIG. 16, the camera angle setting table that is set according to the above-described method is shown.

In the camera angle setting table, items of ports 1 to 3 are shown and respective types of devices connected respectively with the connector terminals are also shown. Specifically, the PCs are connected with the connector terminals corresponding to ports 1, 2 respectively and the TV conference system is connected with the connector terminal corresponding to port 3. The angle can be set for each port.

With respect to the angle of the initial state of the camera provided at the TV conference system connected with the connector terminal corresponding to port 3, the angle of each device is set.

Specifically, for PC (5) associated with port 1, the angle is set to 30°. For PC (10) associated with port 2, the angle is set to −30°. The positive "+" angle refers to the angle in the clockwise direction with respect to the camera angle of the initial state, and the negative "−" angle refers to the angle in the counterclockwise direction with respect to the camera angle of the initial state.

For example, when the display manipulation is performed at information processor 5 on the object of "FILE A" placed in workspace 50 as described above, the camera angle is set to the angle associated with the port corresponding to information processor 5. Specifically, information processor manipulation detection unit 32 detects the display manipulation on the object and outputs the result of detection to peripheral control information management unit 26. Peripheral control information management unit 26 outputs, based on the result of detection provided from information processor manipulation detection unit 32, the information about the camera angle setting table as described above and control signal information for setting the camera angle, to peripheral control unit 28. Peripheral control unit 28 outputs a control signal to TV conference system 15 connected with the connector terminal corresponding to port 3 via connector 36, so that the angle of the camera provided at TV conference system 15 is set to the angle (30°) stored in the camera angle setting table. TV conference system 15 receives the control signal that is input via connector 36 from peripheral control unit 28, and accordingly directs the camera in the clockwise direction by 30° with respect to the initial state, namely directs the camera toward information processor 5.

When the display manipulation is performed at information processor 10 on the object of "FILE A" placed in workspace 50 as described above, the camera angle is set to the angle associated with the port corresponding to information processor 10. Specifically, information processor manipulation detection unit 32 detects the display manipulation on the object and outputs the result of detection to peripheral control information management unit 26. Peripheral control information management unit 26 outputs, based on the result of detection provided from information processor manipulation detection unit 32, the information about the camera angle setting table as described above and control signal information for setting the camera angle, to peripheral control unit 28. Peripheral control unit 28 outputs a control signal to TV conference system 15 connected with the connector terminal corresponding to port 3 via connector 36, so that the angle of the camera provided at TV conference system 15 is set to the angle (−30°) stored in the camera angle setting table. TV conference system 15 receives the control signal that is input via connector 36 from peripheral control unit 28, and accordingly directs the camera in the counterclockwise direction by 30° with respect to the initial state, namely directs the camera toward information processor 10.

In contrast, when the non-display manipulation is performed at information processor 5 on the object of "FILE A" placed in workspace 50 as described above, the camera angle is set to the initial state. Specifically, information processor manipulation detection unit 32 detects the non-display manipulation on the object, and outputs the result of detection to peripheral control information management unit 26. Peripheral control information management unit 26 outputs, based on the result of detection provided from information processor manipulation detection unit 32, the information about the camera angle setting table as described above and control signal information for setting the camera angle, to peripheral control unit 28. Peripheral control unit 28 outputs a control signal to TV conference system 15 connected with the connector terminal corresponding to port 3 via connector 36, so that the angle of the camera provided at TV conference system 15 is set to the initial state. TV conference system 15 receives the control signal that is input via connector 36 from peripheral control unit 28, and accordingly directs the camera in the direction of the initial state.

In the above-described manner, the camera angle of the TV conference system is set in the direction of the information processor at which the display manipulation is performed on the object. When the non-display manipulation is performed on the object, the camera angle of the TV conference system is set to the initial state. Namely, according to manipulation on an object in workspace 50, the angle of the camera provided at the TV conference system that is a peripheral can be controlled.

According to the above description of the present embodiment, the camera angle of the TV conference system that is a peripheral is controlled in association with the manipulation of positioning a cursor on and double-clicking the object of "FILE A" (instruction to open or close the file) by a pointing device. The manipulation is not limited to the above-described ones. Specifically, the camera angle may be controlled in association with the manipulation for moving, displaying in full-screen mode, deleting or printing the object, for example. Further, the control is not limited to the control of the camera angle of the TV conference system, and another operation of a peripheral may be controlled.

Second Embodiment

Figure 17:
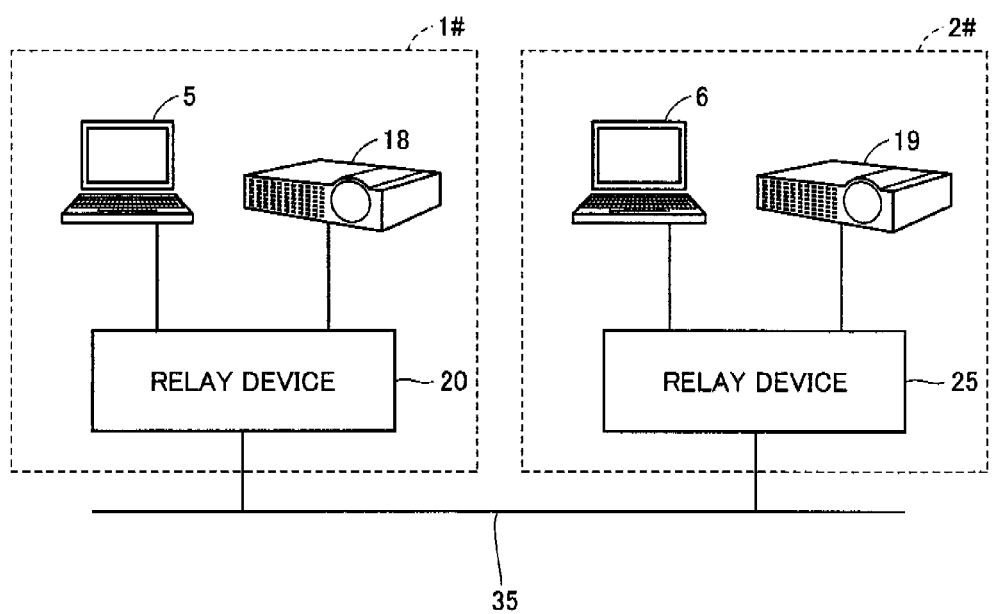
FIG. 17 is a schematic illustrating an information sharing system according to a second embodiment of the present invention.

FIG. 17 will be used to describe an information sharing system according to a second embodiment of the present invention.

Referring to FIG. 17, in the information sharing system according to the second embodiment of the present invention, information sharing units 1#, 2# configured in a local area are provided, and information sharing units 1#, 2# are connected with each other by a network 35. While only information sharing units 1#, 2# are connected with each other by network 35 according to the description of the present embodiment, the information sharing system is not particularly limited to this configuration. The system may be configured to include an additional plurality of information sharing units connected with the network or may be configured to include only one information sharing unit. Network 35 may be LAN (Local Area Network) or WAN (Wide Area Network) using public lines or the like.

Information sharing unit 1# according to the second embodiment of the present invention includes a PC 5 that is a kind of information processor, a projector 18 that is a peripheral, and a relay device 20.

Information sharing unit 2# also includes a PC 6 that is a kind of information processor, a projector 19 that is a peripheral, and a relay device 25.

Relay devices 20, 25 are connected with network 35.

Here, projectors 18, 19 in the present embodiment each project a workspace that is a common work area screen on a large screen or the like.

A description will now be given of a cooperative process with a projector that is a peripheral according to the second embodiment of the present invention.

Specifically, a method for associating a display manipulation or non-display manipulation on an object in the workspace with the projector will be described.

FIG. 18 will be used to describe how the display manipulation or non-display manipulation on an object in the workspace is associated with an operation of the projector according to the second embodiment of the present invention. The command, namely an instruction concerning association of the display manipulation or non-display manipulation on an object in the workspace with an operation of the projector is stored in advance in peripheral control information management unit 26. Further, control signal information for setting an operation of the projector such as turning on the projector, turning off the projector, and turning on the projector and projecting an object view, for example, is also stored in advance.

Referring to FIG. 18(a), a projector operation setting screen 100 is shown here. Specifically, respective operations associated with the display manipulation and the non-display manipulation on an object are shown.

Here, respective operations associated with the object display manipulation and the object non-display manipulation are displayed as "none."

Referring to FIG. 18(b), projector operation setting screen 100 is displayed where a plurality of selectable items are displayed as operations of the projector to be associated with the object display manipulation. Specifically, as a pull-down menu button 102 is clicked (designated), a plurality of selectable items are displayed. In particular, one of four items that are by way of example "none," "turn off projector," "turn on projector" and "turn on projector and project object view" can be selected by clicking the item by means of a mouse that is a pointing device.

"Turn off projector" refers to turning off the projector to end projection. "Turn on projector" refers to turning on the projector to start projection. "Turn on projector and project object view" refers to turning on the projector to start projection and projecting the contents of the object in the workspace.

A user selects respective operations of the projector to be associated with the object display manipulation and the object non-display manipulation.

Here, respective projector operations associated with the object display manipulation and the object non-display manipulation are displayed as "none."

Referring to FIG. 18(c), as a projector operation to be associated with the object display manipulation, "turn on projector" is selected on projector operation setting screen 100. The projector operation to be associated with the object non-display manipulation is set to "none."

Then, as the "OK" button is clicked (designated) by a mouse that is a pointing device, respective projector operations associated with the object display manipulation and the object non-display manipulation are defined. The setting details are stored by peripheral control information management unit 26 of relay device 20.

Further, the setting details are also transmitted via communication unit 29 of relay device 20 to relay device 25, so that peripheral control information management unit 26 of relay device 25 also stores similar setting details.

In this case, if the above-described object display manipulation on "FILE A" placed in workspace 50 is done at information processor 5, for example, the projector is turned on to start projection. Specifically, information processor manipulation detection unit 32 detects the object display manipulation to output the result of detection to peripheral control information management unit 26. Based on the result of detection from information processor manipulation detection unit 32, peripheral control information management unit 26 outputs, to peripheral control unit 28, control signal information for defining the projector operation according to the details of the projector operation associated with the object display manipulation. Peripheral control unit 28 outputs a control signal via connector 36 to projector 18 for turning on the projector. Projector 18 receives the control signal that is provided from peripheral control unit 28 via connector 36, and is turned on to start projection.

The same workspace as information processor 5 is delivered so that the workspace is also displayed on the display unit of information processor 6.

Specifically, as described above, relay device 20 transmits to relay device 25 the result of detection obtained by information processor manipulation detection unit 32 of relay device 20. In particular, relay device 20 transmits to relay device 25 the result of detection that the coordinate position of the object of "FILE A" in workspace 50 is double-clicked.

At relay device 25, information processor display transmission and reception unit 34 receives the result of detection that the coordinate position of the object is double-clicked as transmitted from relay device 20, and outputs the result of detection to workspace control unit 22.

At relay device 25, workspace control unit 22 performs, based on the result of detection (object display manipulation) received by information processor display transmission and reception unit 34, a display process for the common work area screen (workspace) for sharing information. Specifically, it is determined that the coordinate position of the object is double-clicked, namely the object of "FILE A" is double-clicked by adjusting the pointing device, and the display process is performed for expanding the contents of "FILE A." More specifically, workspace control unit 22 of relay device 25 generates a display image of the object in the workspace.

Further, information processor display transmission and reception unit 34 of relay device 25 outputs the received result of detection (object display manipulation) to peripheral control information management unit 26 of relay device 25. Peripheral control information management unit 26 receives the result of detection and outputs, to peripheral control unit 28, control signal information for defining the projector operation, according to the specific operation of the projector associated with the object display manipulation, based on the received result of detection. Peripheral control unit 28 outputs a control signal to projector 19 via connector 36 for turning on the projector. Projector 19 receives the control signal that is input via connector 36 from peripheral control unit 28, and is turned on to start projection.

In contrast, if the above-described object non-display manipulation on "FILE A" placed in workspace 50 is performed at information processor 5, the operation of the projector remains unchanged in this embodiment, since the projector operation is set to "none." In the case where the operation is set to "turn off projector," projectors 18, 19 are turned off and the projection is ended in a similar manner to the above-described one, Further, in the case where the operation is set to "turn on projector and project object view" in association with the object display manipulation, projectors 18, 19 are turned on in response to the execution of the above-described object display manipulation, projection is started and the contents of the object in the workspace are projected, in a similar manner to the above-described one.

In this way, the operation of the projector which is a peripheral can be controlled in response to execution of the object display manipulation or non-display manipulation. In other words, according to manipulation of an object in workspace 50, the operation of projector 18 that is a local peripheral with respect to relay device 20 can be controlled, and the operation of projector 19 that is connected with another relay device 25 can also be controlled.

According to the present embodiment, how the relay device executes a process such as a process for displaying contents in response to the object display manipulation has been described. Alternatively, the information processor may execute the process for displaying contents in response to the object display manipulation.

Further, according to the above description of the workspace activation process, the workspace is automatically activated after relay device 20 is powered, and relay device 20 delivers the initial screen of the workspace to a local information processor for example. The present invention, however, is not particularly limited to this. An initial screen for browsing/editing the workspace may be started by the local information processor, and the "MENU" button shown in FIG. 5 may be selected to give an instruction to activate the workspace so that the workspace can be delivered from relay device 20 in the manner as described with reference to FIG. 7. Further, in the case where relay device 20 and the local information processor are not connected with each other while the local information processor starts the initial screen and the instruction to activate the workspace is given, the workspace delivery process described with reference to FIG. 7 may be performed when relay device 20 and the local information processor are connected with each other. Here, using the powering of relay device 20, the workspace delivery process may be executed when relay device 20 is powered.

The peripheral of the present invention is not limited to the TV conference system or projector, and may be MFP, scanner, printer, camera, microphone, or IP (Internet Protocol) telephone, for example. For each of the components for controlling the relay device, a program may be provided that causes a computer to function and execute the control as described above in connection with the flow diagrams. Such a program may be provided in the form of a program product recorded on a computer-readable recording medium such as flexible disk, CD-ROM (Compact Disk-Read Only Memory), ROM (Read Only Memory), RAM (Random Access Memory), and memory card accompanying a computer. Alternatively, the program may be provided in the form recorded on a recording medium such as hard disk included in a computer. Further, a program may be provided in the form downloaded via a network.

The program according to the present invention may call, at predetermined timings and in a predetermined order, necessary modules among program modules provided as a part of an operation system (OS) of a computer, to execute a process. In this case, the program itself does not include the above-described modules, and a process is carried out in cooperation with the OS. Such a program without module may also be included in the program of the present invention.

The program according to the present invention may be provided in the form incorporated in another program as a part of the other program. In this case as well, the program of the present invention itself does not include modules included in the other program, and a process is carried out in cooperation with the other program. Such a program incorporated in the other program may also be included in the program of the present invention.

The program product as provided is installed on a program storage unit such as hard disk and executed. The program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information sharing system comprising:
   an information processor including a display and an input device for manipulating information displayed on said display;
   a peripheral capable of at least one of accepting input of information and outputting information; and
   a relay device connected with said information processor and said peripheral,
   said relay device including:
      a transmitter for transmitting a common work area screen for sharing information to said information processor connected with said relay device; and
      a controller for controlling said relay device, wherein said controller:
         detects manipulation by the input device of said information processor on said common work area screen transmitted to said information processor,
         executes a process according to a result of detection of said manipulation by the input device of said information processor on said common work area screen, and
         controls operation of said peripheral connected with said relay device according to the result of detection of said manipulation by the input device of said information processor,
   wherein said controller identifies type of said peripheral connected with said relay device,
   said relay device further includes a memory in which control information for controlling operation of said peripheral according to the identified type of said peripheral is registered, and
   said controller outputs to said peripheral the control information registered in said memory, according to the result of detection of said manipulation by the input device of said information processor.

2. The information sharing system according to claim 1, wherein
   the manipulation by said input device of said information processor corresponds to at least one of an instruction to open, an instruction to close, an instruction to move, an instruction to display in full-screen mode, an instruction to delete, and an instruction to print, a data file on said common work area screen.

3. The information sharing system according to claim 1, wherein
   said peripheral corresponds to at least one of a TV conference system, a printer, a scanner, a camera, a microphone, an IP telephone, and a projector.

4. An information sharing system comprising:
   an information processor including a display and an input device for manipulating information displayed on said display;
   a peripheral capable of at least one of accepting input of information and outputting information; and
   a relay device connected with said information processor and said peripheral,
   said relay device including:
      a transmitter for transmitting a common work area screen for sharing information to said information processor connected with said relay device; and
      a controller for controlling said relay device, wherein said controller:
         detects manipulation by the input device of said information processor on said common work area screen transmitted to said information processor,
         executes a process according to a result of detection of said manipulation by the input device of said information processor on said common work area screen, and
         controls operation of said peripheral connected with said relay device according to the result of detection of said manipulation by the input device of said information processor;
   another relay device configured identically to said relay device and connected with said relay device by a network; and
   another peripheral connected with said another relay device, wherein
   said relay device and said another relay device each further include a communication device capable of transmitting and receiving information to and from each other via said network,
   the controller of said relay device transmits, to said another relay device using said communication device, control information for controlling said another peripheral connected with said another relay device, and
   a controller of said another relay device receives the control information and controls operation of said another relay device according to said received control information.

5. A relay device comprising:
   a connector connected with an information processor having a display and with a peripheral;
   a transmitter for transmitting a common work area screen for sharing information, to said information processor; and
   a controller for entirely controlling said relay device, wherein said controller:
      detects manipulation by an input device of said information processor on said common work area screen transmitted to said information processor,
      executes a process according to a result of detection of said manipulation by the input device of said information processor on said common work area screen, and
      controls operation of said peripheral connected with said relay device according to the result of detection of said manipulation by the input device of said information processor, wherein said controller identifies type of said peripheral connected with said relay device, said relay device further includes a memory in which control information for controlling operation of said peripheral according to the identified type of said peripheral is registered, and said controller outputs to said peripheral the control information registered in said memory, according to the result of detection of said manipulation by the input device of said information processor.

* * * * *